US009605774B2

(12) United States Patent
Shiga et al.

(10) Patent No.: US 9,605,774 B2
(45) Date of Patent: Mar. 28, 2017

(54) CLAMP (75) Inventors: Kouki Shiga, Mie (JP); Masato Ezaki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/236,975

(22) PCT Filed: Feb. 28, 2012

(86) PCT No.: PCT/JP2012/054972
§ 371 (c)(1),
(2), (4) Date: Feb. 4, 2014

(87) PCT Pub. No.: WO2013/042387
PCT Pub. Date: Mar. 28, 2013

(65) Prior Publication Data
US 2014/0166825 A1 Jun. 19, 2014

(30) Foreign Application Priority Data

Sep. 22, 2011 (JP) .................................. 2011-207882

(51) Int. Cl.
*F16L 3/10* (2006.01)
*F16L 3/12* (2006.01)
(Continued)

(52) U.S. Cl.
CPC ............ *F16L 3/12* (2013.01); *B60R 16/0215* (2013.01); *H02G 3/32* (2013.01); *F16L 3/08* (2013.01); *F16L 3/10* (2013.01)

(58) Field of Classification Search
USPC .......... 248/65, 70, 71, 73, 74.1, 74.2, 230.6, 248/231.71, 229.15, 229.25; 24/21, 24,
(Continued)

(56) References Cited

U.S. PATENT DOCUMENTS 2,248,170 A * 7/1941 Hansen .......................... 224/570
3,061,253 A * 10/1962 Keaton ........................ 248/74.1
(Continued)

FOREIGN PATENT DOCUMENTS

JP          11-26093       1/1999
JP          2003-56754     2/2003
(Continued)

*Primary Examiner* — Alfred J Wujciak
(74) *Attorney, Agent, or Firm* — Greenblum & Bernstein, P.L.C.

(57) ABSTRACT

A clamp has a function of attaching a pipe harness in which electric wires are inserted into a metal pipe to a vehicle body, and a function of externally fitting and fixing a grommet to the pipe harness. A first portion and a second portion having a pair of semicircular inner surfaces are coupled with a thin-walled hinge, the clamp being provided with a locking portion and a locked portion that can be locked to each other on free end sides, a vehicle body fixing portion being provided on either the first portion or the second portion, and grommet fixing projections extending in the circumferential direction being provided on the semicircular inner surfaces of the first portion and the second portion, and a cylindrical portion of the grommet that is externally fitted to the pipe harness is covered with the first portion and the second portion.

8 Claims, 7 Drawing Sheets

(51) Int. Cl.
 *B60R 16/02* (2006.01)
 *H02G 3/32* (2006.01)
 *F16L 3/08* (2006.01)

(58) Field of Classification Search
 USPC .......... 24/455, 470, 471, 485, 487, 542, 543
 See application file for complete search history.

(56) References Cited

U.S. PATENT DOCUMENTS

| | | | | |
|---|---|---|---|---|
| 4,478,381 | A | * | 10/1984 | Pittion et al. ................... 248/71 |
| 4,653,716 | A | * | 3/1987 | Sakaguchi ................ 248/316.5 |
| 5,257,768 | A | * | 11/1993 | Juenemann et al. .......... 248/604 |
| 6,053,749 | A | | 4/2000 | Masuda et al. |
| 6,145,793 | A | * | 11/2000 | Kroulik et al. .............. 248/74.1 |
| 6,164,604 | A | * | 12/2000 | Cirino et al. ................ 248/74.3 |
| 6,676,091 | B2 | * | 1/2004 | Hauer ........................... 248/74.3 |
| 8,827,214 | B2 | * | 9/2014 | Ogawa .......................... 248/74.1 |
| 8,973,880 | B2 | * | 3/2015 | Goffman .................... 248/230.4 |

FOREIGN PATENT DOCUMENTS

| | | |
|---|---|---|
| JP | 2008-21425 | 1/2008 |
| JP | 2010-215010 | 9/2010 |

\* cited by examiner

CLAMP

FIELD OF THE INVENTION

The present invention relates to a clamp. Specifically, the present invention relates to a clamp having a function of attaching a pipe harness to a vehicle body and a function of externally fitting and fixing a grommet to a pipe harness.

BACKGROUND ART

Figure 6:
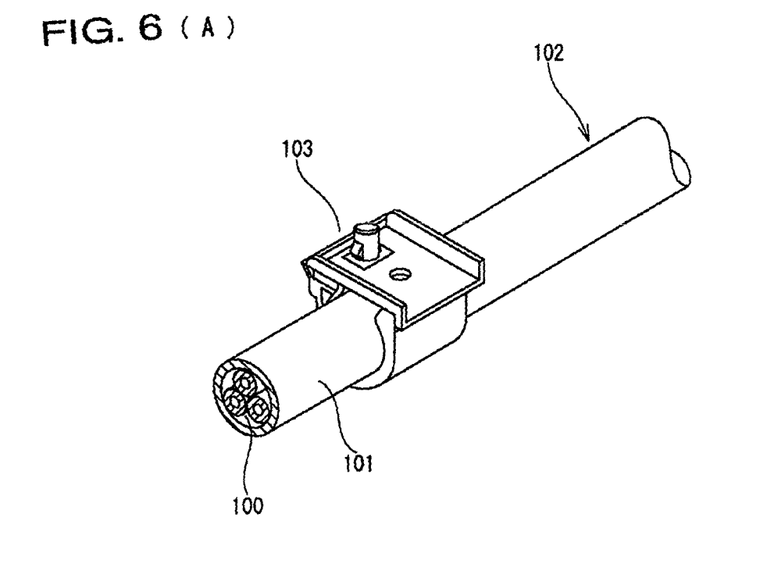
FIG. 6(A) is an enlarged view of the main part of a pipe harness to which the clamp is fixed.
FIG. 6(B) is a schematic view showing a state in which the pipe harness is attached to the vehicle body.

In hybrid cars and electric cars, there are cases where electric wires connecting a battery and an inverter, or an inverter and a motor are inserted into a metal pipe to be wired. In JP 2010-215010A (Patent Document 1), the applicant proposes that a pipe harness 102 is formed inserting electric wires 100 for being wired from a rear portion to a front portion of a hybrid car into a metal pipe 101 as shown in FIGS. 6(A) and 6(B), and the pipe harness 102 is attached to a vehicle body 104 (undersurface of a floor panel) using a clamp 103 shown in FIG. 6(A).

Figure 7:
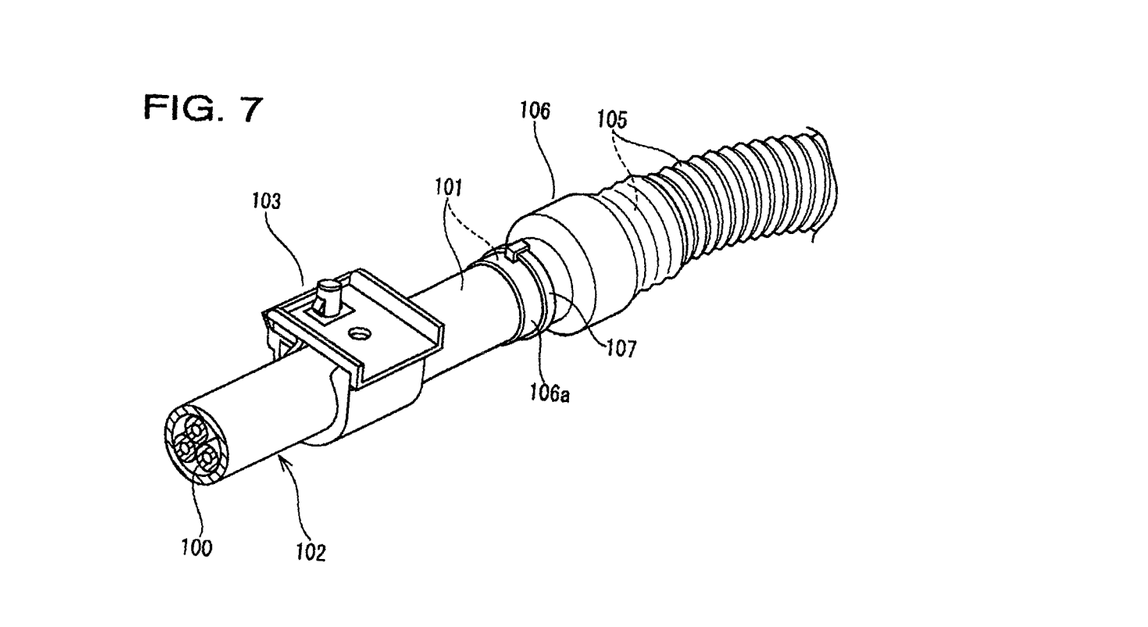
FIG. 7 is a drawing of a conventional example.

An end of the metal pipe 101 of the pipe harness 102 is generally coupled to a flexible exterior material 105 such as a corrugated tube, and the electric wires 100 drawn out of the end of the metal pipe 101 are often inserted into the exterior material 105 to be wired to the front portion of the vehicle or to a connection mating equipment in the rear portion of the vehicle. A water sealing grommet 106 shown in FIG. 7 is externally fitted to a coupling portion where the end of the metal pipe 101 is coupled to the end of the exterior material 105, and a cylindrical portion 106a of the grommet 106 is fixed to the end of the metal pipe 101 with a tie band 107. Furthermore, when the end side of the metal pipe 101 passes through a through hole (not shown) of the vehicle body, as shown in FIG. 8, a grommet 108 for being inserted into the through hole and locked thereto is externally fitted to the end side of the metal pipe 101, and a small diameter cylindrical portion 108a of the grommet 108 is fixed to the metal pipe 101 with a tie band 109, or the like.

Figure 8:
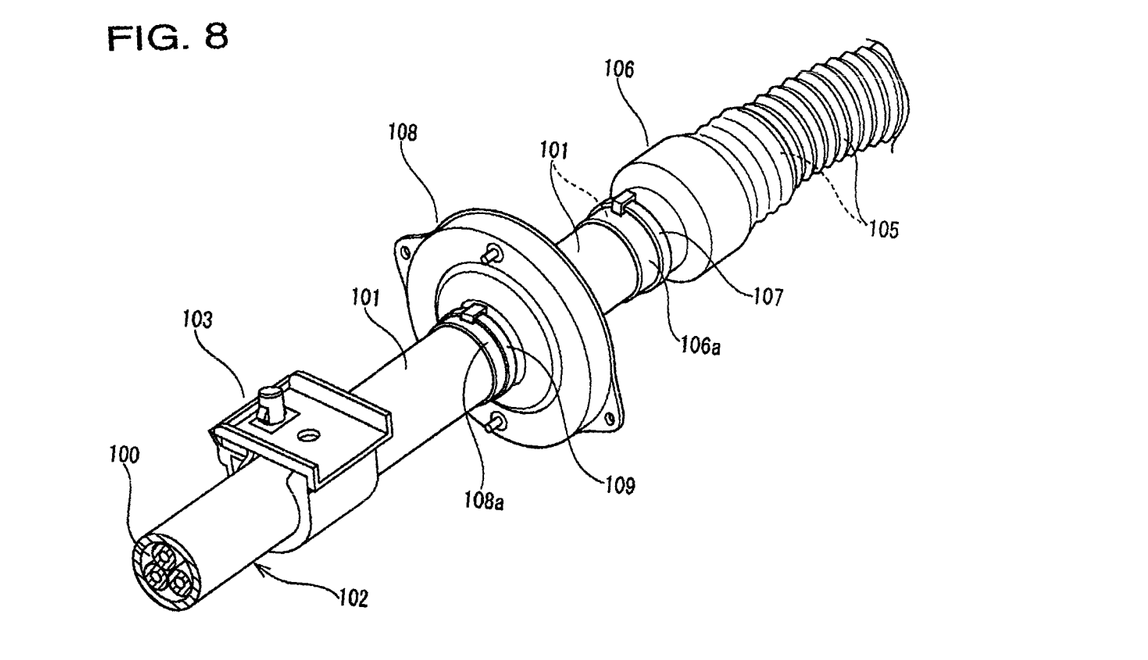
FIG. 8 is a drawing of a conventional example.
Figure 9:
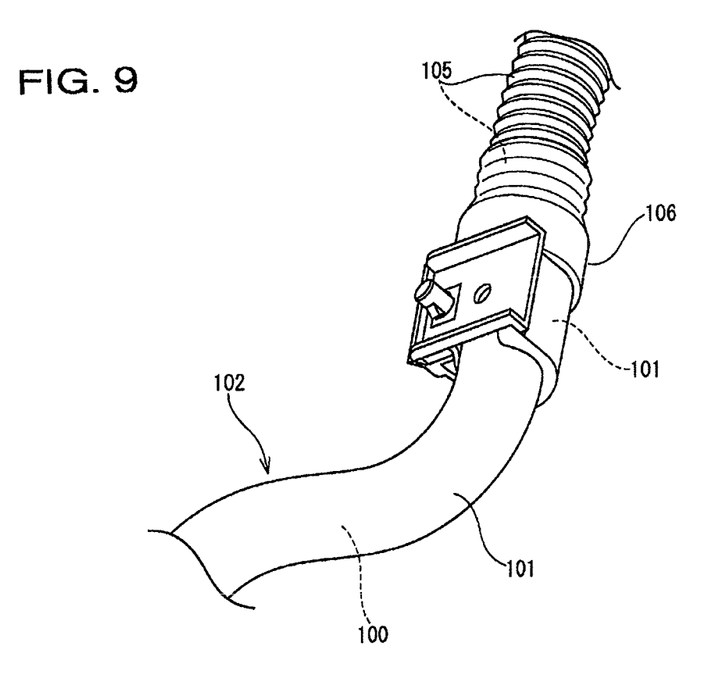
FIG. 9 is a drawing of a conventional example.

Meanwhile, since it is preferable that the clamp 103 is also fixed to the end side of the metal pipe 101 and attached to the vehicle body in order to stably hold the pipe harness 102 on the vehicle body 104, conventionally, the clamp 103 and the grommets 106 and 108 are separately fixed to the end side of the metal pipe 101 as shown in FIG. 7 and FIG. 8. However, there is a problem that working man-hours and the number of part items increase in this configuration. Additionally, since the pipe shape of the pipe harness 102 has been complicated and the ends of many metal pipes 101 are bent as shown in FIG. 9 in recent years, there is also a problem that it is difficult to fix the clamp 103 as shown in FIG. 6(A) to the bent metal pipe 101.

CITATION LIST

Patent Document

Patent Document 1: JP 2010-215010A

SUMMARY OF THE INVENTION

Technical Problem

It is an object of the present invention to enable a pipe harness to be attached to a vehicle body and enable a grommet to be externally fitted and fixed to the pipe harness by small working man-hours and the small number of part items.

Solution to Problem

To solve the above-described problems, the present invention provides a clamp made of a resin molded article, having a function of attaching a pipe harness in which electric wires are inserted into a metal pipe to a vehicle body, and a function of externally fitting and fixing a grommet to the pipe harness, wherein the clamp has a configuration in which a first portion and a second portion having a pair of semicircular inner surfaces are coupled with a thin-walled hinge, the clamp being provided with a locking portion and a locked portion that can be locked to each other on free end sides of the first and the second portions, a vehicle body fixing portion being provided on either the first portion or the second portion, and grommet fixing projections extending in the circumferential direction being provided on the semicircular inner surfaces of the first portion and the second portion, and a cylindrical portion of the grommet made of rubber or elastomer that is externally fitted to the pipe harness is covered with the first portion and the second portion, so that the grommet fixing projections of the first portion and the second portion are pushed against and fixed to an entire outer circumferential surface of the cylindrical portion of the grommet.

As described above, the clamp of the present invention is provided with the grommet fixing projections extending in the circumferential direction on a pair of semicircular inner surfaces of the first and the second portions that are coupled with the thin-walled hinge, with the locking portion and the locked portion that are locked to each other on the free end sides of the first and the second portions, and further with the vehicle body fixing portion on either the first portion or the second portion. Accordingly, by merely covering the cylindrical portion of the grommet for being externally fitted to the pipe harness with the first and the second portions of the clamp and locking the free end sides, the grommet fixing projections of the first and the second portions are pushed against the entire outer circumferential surface of the cylindrical portion of the grommet, so that the grommet can be externally fitted and fixed to the pipe harness in a close contact state, and the pipe harness clamped between the first and the second portions can be also attached to the vehicle body through the vehicle body fixing portion.

That is, since the clamp of the present invention has a function of attaching a pipe harness to a vehicle body and a function of externally fitting and fixing a grommet to a pipe harness, fixing of the grommet to the pipe harness and fixing of the clamp need not be performed separately as in a conventional manner. Therefore, working man-hours can be reduced, and the number of part items can also be reduced because fixing parts such as tie bands conventionally used to fix the grommet to the pipe harness are not required. Furthermore, since the clamp of the present invention has a structure in which the clamp is fixed onto the cylindrical portion of the grommet for being externally fitted to the pipe harness, the clamp can be stably fixed with reduced space without being affected by the pipe shape of the pipe harness.

It is preferable that each of the first portion and the second portion is provided with a single grommet fixing projection or a plurality thereof in parallel, and that the grommet fixing projection can be fitted into and attached to an annular recessed portion provided on the outer circumferential surface of the cylindrical portion of the grommet.

As described above, the grommet fixing projections provided on the first and the second portions are fitted into and attached to the annular recessed portion provided on the outer circumferential surface of the cylindrical portion of the grommet, so that capability of the clamp to hold the grommet is enhanced and sealing performance of the grommet and the pipe harness is more enhanced.

It is preferable that the grommet for being externally fitted to the pipe harness is a water sealing grommet for being externally fitted to a coupling portion where a bent end of the metal pipe is coupled to an exterior corrugated tube, or a grommet for being externally fitted to the bent end side of the metal pipe for being inserted into a through hole of a vehicle body and locked thereto.

There is no particular limitation on the fixed position on the metal pipe and the pipe shape, as long as the clamp of the present invention is fixed to the cylindrical portion of the grommet for being externally fitted and fixed to the metal pipe. However, when the grommet is externally fitted to the bent end or the bent end side of the metal pipe as described above, it is difficult to fix a conventional clamp to the vicinity of the grommet, and therefore the clamp of the present invention is particularly useful.

Although there is no particular limitation on the structure of the vehicle body fixing portion provided on the first portion or the second portion, it is preferable that the clamp has a configuration in which, for example, the vehicle body fixing portion provided on the first portion or the second portion includes a locking hole into which a stud bolt or a bracket projecting from the vehicle body can be inserted and locked thereto, or an attaching substrate projects outward from the first portion or the second portion and is provided with a bolt hole, so that the vehicle body fixing portion can be fastened to the vehicle body with a bolt.

Furthermore, it is preferable that the clamp has a configuration in which the attaching substrate of the vehicle body fixing portion has a shape capable of mounting other electrical equipment holding material or a bracket, and a bolt hole provided on the electrical equipment holding material can be brought into communication with the bolt hole of the attaching substrate, so that the other electrical equipment holding material can be also attached to a vehicle body. With this configuration, working man-hours and the number of part items can be further reduced, and space saving can be achieved.

It is preferable that the clamp of the present invention is used for a pipe harness in which a wire harness for being routed in a hybrid car or an electric car is inserted into a metal pipe.

Moreover, it is preferable that the electric wire harness connect a battery and an inverter, or an inverter and a motor, of a hybrid car or an electric car and has a structure in which the wire harness is inserted into a metal pipe and arranged on an undersurface side of a floor panel, and the end side of the metal pipe is bent to draw the wire harness into the inside of the vehicle.

Advantageous Effects of the Invention

As described above, the clamp of the present invention is provided with the grommet fixing projections extending in the circumferential direction on a pair of semicircular inner surfaces of the first and the second portions that are coupled with the thin-walled hinge, with the locking portion and the locked portion that are locked to each other on the free end sides of the first and the second portions, and further with the vehicle body fixing portion on either the first portion or the second portion. Accordingly, by merely covering the cylindrical portion of the grommet for being externally fitted to the pipe harness with the first and the second portions of the clamp and locking the free end sides, the grommet fixing projections of the first and the second portions are pushed against the entire outer circumferential surface of the cylindrical portion of the grommet, so that the grommet can be externally fitted and fixed to the pipe harness in a close contact state, and the pipe harness clamped between the first and the second portions can be also attached to the vehicle body through the vehicle body fixing portion.

That is, since the clamp of the present invention has a function of attaching a pipe harness to a vehicle body and a function of externally fitting and fixing a grommet to a pipe harness, working man-hours and the number of part items can be reduced. Moreover, since the clamp of the present invention has a structure in which the clamp is fixed onto the cylindrical portion of the grommet for being externally fitted to the pipe harness, the clamp can be stably fixed with reduced space without being affected by the pipe shape of the pipe harness.

BRIEF DESCRIPTION OF DRAWINGS

FIGS. 6(A) and 6(B) are drawings of a conventional example.

DESCRIPTION OF EMBODIMENTS

Hereinafter, embodiments of the present invention will be described with reference to the drawings.

Figure 1:
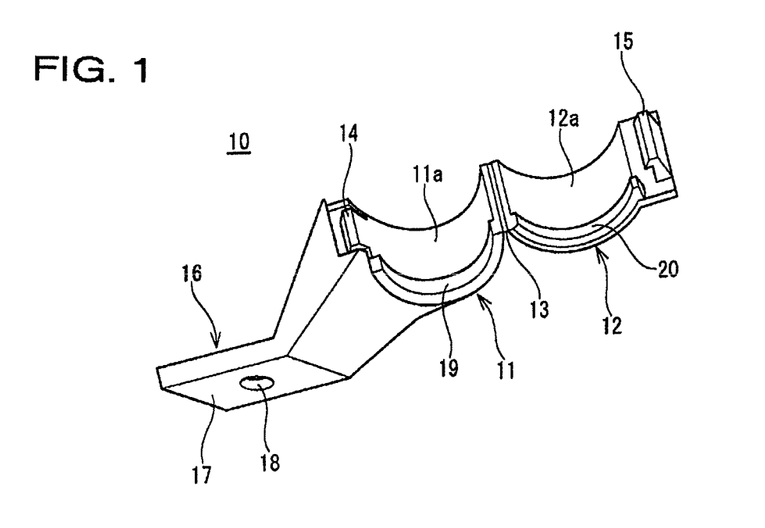
FIG. 1 is a perspective view of a clamp of the first embodiment.
Figure 2:
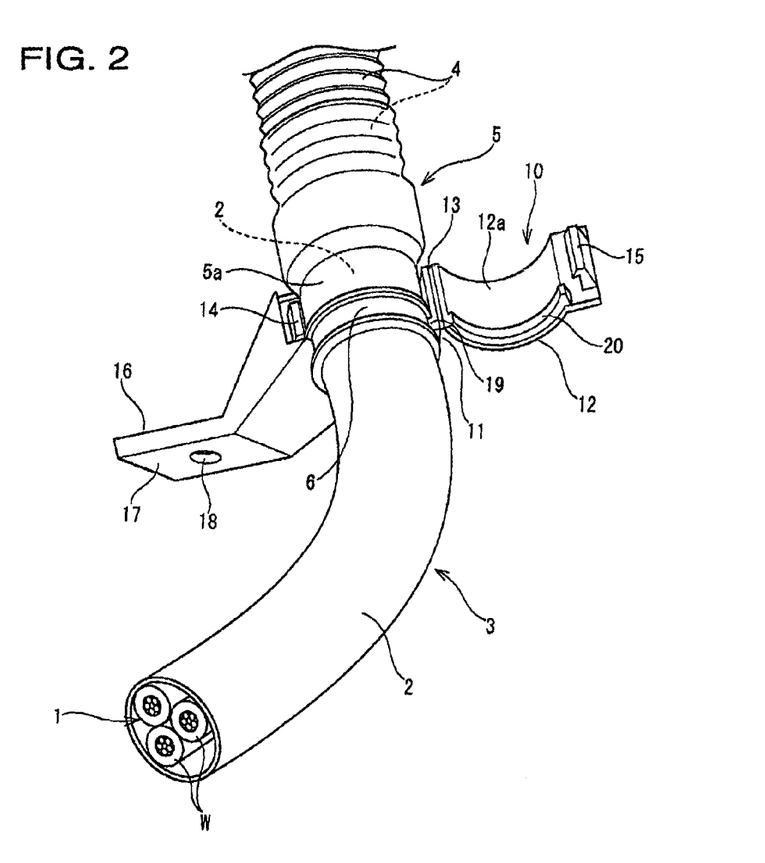
FIG. 2 is a perspective view showing a state in which the clamp is being fixed to a cylindrical portion of a grommet.
Figure 3:
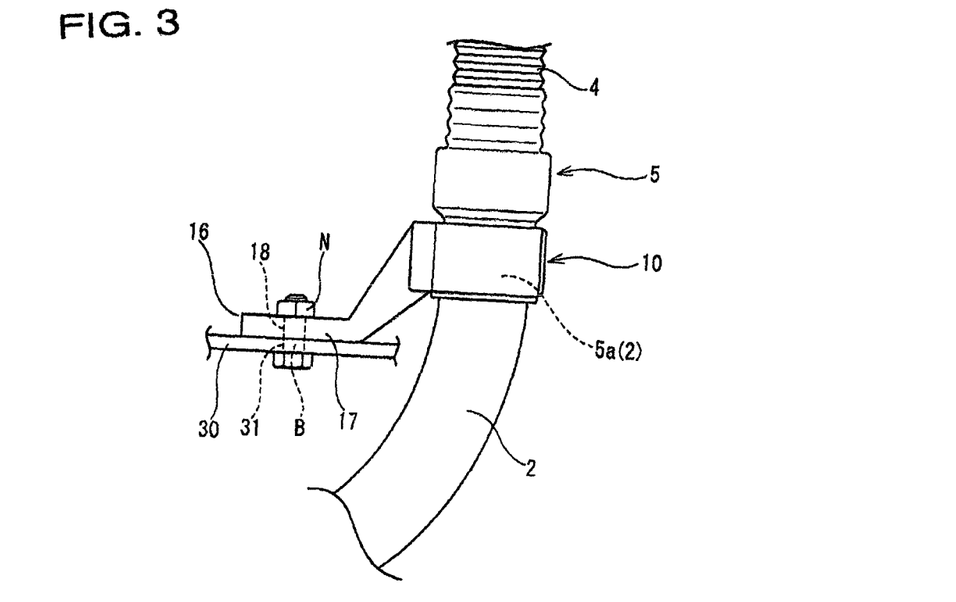
FIG. 3 is a schematic view showing a state in which the clamp fixed to the cylindrical portion of the grommet is attached to the vehicle body.

FIGS. 1 to 3 show the first embodiment. In the first embodiment, a pipe harness 3 is formed by inserting a wire harness 1 including two to three electric wires W for connecting a battery and an inverter, or an inverter and a motor (not shown), of a hybrid car into a metal pipe 2 made of aluminum alloy, and the pipe harness 3 is arranged on an undersurface side (not shown) of a floor panel of a vehicle body. Furthermore, the end side of the metal pipe 2 is bent as shown in FIG. 2, and the wire harness 1 is drawn into an engine room (not shown). An exterior corrugated tube 4 is coupled to the end of the bent metal pipe 2, and the wire harness 1 drawn out of the end of the metal pipe 2 is inserted into the corrugated tube 4 and routed to the inverter. A water sealing rubber grommet 5 (referred to as grommet 5 hereinafter) is externally fitted to a coupling portion where the end of the bent metal pipe 2 is fixed to the end of the corrugated tube 4. The clamp 10 is fixed to an outer circumferential surface of a cylindrical portion 5a that is externally fitted to the end of the metal pipe 2, and the clamp 10 is also fixed to a predetermined position of the vehicle body 30.

As shown in FIG. 1, the clamp 10, which is made of a resin molded article, includes a first portion 11 and a second portion 12 having a pair of semicircular inner surfaces 11a and 12a, respectively, and one end of the first portion 11 and one end of the second portion 12 are openably and closably coupled with a thin-walled hinge 13. Moreover, a locked portion 14 and a locking portion 15 that are locked to each other are provided on respective free ends, which are the other ends of the first and the second portions 11 and 12. The locked portion 14 provided on the first portion includes an elastic locked piece that continues in the circumferential direction of the semicircular inner surface 11a, and the locking portion 15 provided on the second portion is formed of a locking hook that is locked to the locked portion 14 including the elastic locked piece. Furthermore, a vehicle body fixing portion 16 extends outward on the first portion 11. The vehicle body fixing portion 16 includes an attaching substrate 17 that is provided with a bolt hole 18 through which the clamp 10 is fastened to the vehicle body 30 with a bolt.

Moreover, single continuous grommet fixing projections 19 and 20 project in the circumferential direction of the semicircular inner surfaces 11a and 12a of the first portion 11 and the second portion, and an annular recessed portion 6 to which the grommet fixing projections 19 and 20 are fitted is provided on the outer circumferential surface of a cylindrical portion 5a of the grommet 5. It should be noted that single grommet fixing projections are provided in the present embodiment, but a plurality of the grommet fixing projections may be provided in parallel. In this case, it is preferable that a plurality of the annular recessed portions 6 is also provided in parallel.

Hereinafter, the fixing of the clamp 10 will be described.

First, as shown in FIG. 2, the cylindrical portion 5a of the grommet 5 is covered with the first and the second portions 11 and 12 of the clamp 10 so that the grommet fixing projections 19 and 20 are fitted to the annular recessed portion 6, and the locked portion 14 and the locking portion 15 of the first and the second portions 11 and 12 are locked to each other. Thereby, the pipe harness 3 covered with the cylindrical portion 5a is clamped between the first and the second portions 11 and 12, and the grommet fixing projections 19 and 20 of the first and the second portions 11 and 12 are pushed and fixed to the entire circumference of the annular recessed portion 6 of the cylindrical portion 5a, so that the grommet 5 can be externally fitted and fixed to the pipe harness 3 in a close contact state.

Next, the vehicle body fixing portion 16 provided on the clamp 10 is fastened to the vehicle body 30 with a bolt. Specifically, as shown in FIG. 3, the bolt hole 18 of the attaching substrate 17 and a bolt hole 31 of the vehicle body 30 at a predetermined position are allowed to communicate with each other, and fastened and fixed to each other with a bolt B and a nut N, so that the pipe harness 3 clamped between the first and the second portions 11 and 12 can be attached to the vehicle body 30.

That is, since the clamp 10 of the present embodiment has a function of attaching a pipe harness 3 to a vehicle body 30 and a function of externally fitting and fixing a grommet 5 to a pipe harness 3, working man-hours and the number of part items can be reduced. Moreover, since the clamp 10 has a structure in which the clamp 10 is fixed to the cylindrical portion 5a of the grommet 5 that is externally fitted and fixed to the pipe harness 3, the clamp 10 can be stably fixed thereto with reduced space without being affected by the bent pipe shape of the pipe harness 3.

It should be noted that the vehicle body fixing portion 16 includes the attaching substrate 17 for being fastened to the vehicle body 30 with a bolt in the present embodiment, but the vehicle body fixing portion may include a locking hole into which a stud bolt or a bracket projecting from the vehicle body is inserted and locked thereto.

Figure 4:
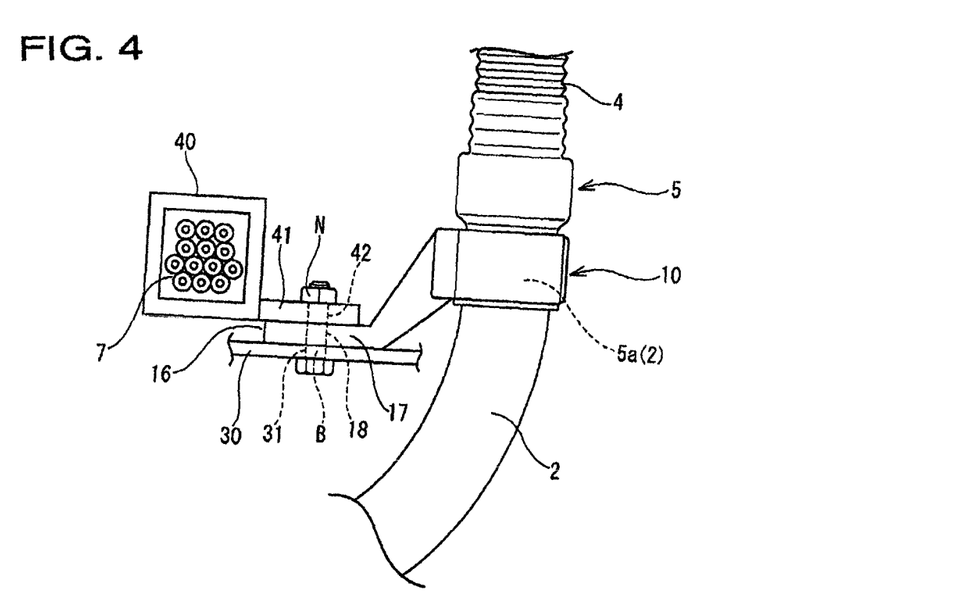
FIG. 4 is a schematic view showing a state in which the clamp is attached to the vehicle body together with other electrical equipment holding material in the second embodiment.

FIG. 4 shows the second embodiment of the present invention.

In the second embodiment, a vehicle body fixing portion 41 of other electrical equipment holding material 40 can be also mounted on the vehicle body fixing portion 16 (attaching substrate 17) of the clamp 10. In the present embodiment, the other electrical equipment holding material 40 is, for example, a protector to be exteriorly installed to an engine harness 7, and is fastened to the vehicle body 30 with a bolt by overlaying a bolt hole 42 provided on a vehicle body fixing portion 41 of the protector on the bolt hole 18 of the attaching substrate 17 and the bolt hole 31 of the vehicle body 30 as shown in FIG. 4.

Other aspects are same as the first embodiment.

As described above, the vehicle body fixing portion 41 of the other electrical equipment holding material 40 can also be mounted on the vehicle body fixing portion 16 of the clamp 10, so that working man-hours and the number of part items can be further reduced, and space saving can be achieved.

Figure 5:
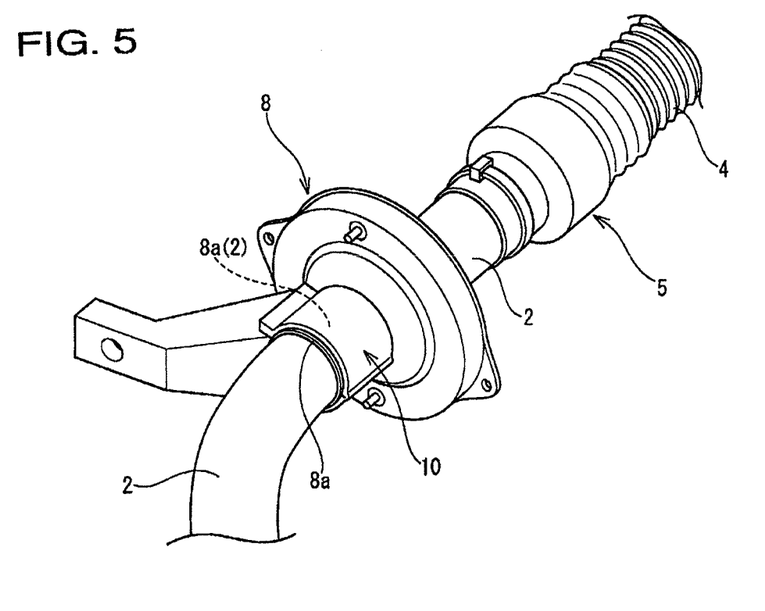
FIG. 5 is a perspective view showing a state in which the clamp is fixed to a small diameter cylindrical portion of the grommet that is inserted into a through hole of the vehicle body and locked thereto in the third embodiment.

FIG. 5 shows the third embodiment of the present invention.

In the third embodiment, a grommet 8 for being inserted into a through hole (not shown) of the vehicle body and locked thereto is externally fitted to the bent end side of the metal pipe 2, and the clamp 10 is fixed to a small diameter cylindrical portion 8a of the grommet 8 that is allowed to come into close contact with the metal pipe 2 (see FIG. 5).

In the first to third embodiments of the present invention, although the clamp 10 is fixed to the cylindrical portion 5a or 8a of the grommet 5 or 8 that is externally fitted to the bent end or the bent end side of the metal pipe 2, the clamp 10 may, of course, be fixed to the cylindrical portion of the grommet for being externally fitted to a non-bent metal pipe.

REFERENCE SIGNS LIST

1 Wire harness
2 Metal pipe
3 Pipe harness
4 Corrugated tube
5, 8 Grommet
5a Cylindrical portion
8a Small diameter cylindrical portion
6 Annular recessed portion
10 Clamp
11 First portion
12 Second portion
11a, 12a Semicircular inner surface
13 Thin-walled hinge
14 Locked portion
15 Locking portion
16, 41 Vehicle body fixing portion
17 Attaching substrate
18, 31, 42 Bolt hole
19, 20 Grommet fixing projection 30 Vehicle body
40 Other electrical equipment holding material

The invention claimed is:

1. A clamp comprising a resin molded article configured for attaching a pipe harness in which electric wires are inserted into a metal pipe to a vehicle body, and externally fitting and fixing a grommet to the pipe harness, the clamp including a first portion and a second portion, having a pair of semicircular inner surfaces coupled with a thin-walled hinge, to define a ring-shape, and the clamp being provided with a locking portion and a locked portion configured to be locked to each other on free end sides of the first and the second portions, a vehicle body fixing portion attached to and extending from only one of the first portion and the second portion, the vehicle fixing portion comprising a flange and an arm, wherein the flange is a plate shaped, wherein the arm extends from the flange at an incline and is connected to an outer periphery of the one of the first portion and the second portion, wherein the flange is configured to be fixed to the vehicle body, wherein the flange is oriented in a first plane and the ring-shape is oriented in a second plane, the first plane and the second plane extending parallel to each other and grommet fixing projections extending in the circumferential direction on the semicircular inner surfaces of the first portion and the second portion, wherein a cylindrical portion of the grommet made of rubber or elastomer that is externally fitted to the pipe harness is covered with the first portion and the second portion, so that the grommet fixing projections of the first portion and the second portion are pushed against and fixed to an outer circumferential surface of the cylindrical portion of the grommet.

2. The clamp according to claim 1, wherein each of the first portion and the second portion is provided with a single grommet fixing projection or a plurality of grommet fixing projections in parallel.

3. The clamp according to claim 1, wherein the grommet fixing projection can be fitted into and attached to an annular recessed portion provided on an outer circumferential surface of the cylindrical portion of the grommet.

4. The clamp according to claim 1, wherein the grommet externally fitted to the pipe harness is a water sealing grommet externally fitted to a coupling portion where a bent end of the metal pipe is coupled to an exterior corrugated tube, or a grommet externally fitted to the bent end of the metal pipe inserted into a through hole of a vehicle body and locked thereto.

5. The clamp according to claim 1, in which the vehicle body fixing portion provided on the first portion or the second portion includes a locking hole into which a stud bolt or a bracket projecting from the vehicle body can be inserted and locked thereto, or an attaching substrate projects outward from the first portion or the second portion and is provided with a bolt hole, so that the vehicle body fixing portion can be fastened to the vehicle body with a bolt.

6. The clamp according to claim 5, in which the attaching substrate of the vehicle body fixing portion has a shape configured for mounting other electrical equipment holding material or a bracket, and a bolt hole provided on the electrical equipment holding material can be brought into communication with the bolt hole of the attaching substrate, so that the other electrical equipment holding material can be also attached to a vehicle body.

7. The clamp according to claim 1, which is used for a pipe harness in which a wire harness routed in a hybrid car or an electric car is inserted into a metal pipe.

8. The clamp according to claim 1, wherein the grommet fixing projections project and extend continuously in the circumferential direction from the semicircular inner surfaces of the first portion and the second portion.

* * * * *